United States Patent [19]

Fortson

[11] Patent Number: 5,372,322
[45] Date of Patent: Dec. 13, 1994

[54] HAND POLE FISHING REELS

[76] Inventor: Warren D. Fortson, 320 Bay Park Dr., Brandon, Miss. 39042

[21] Appl. No.: 937,136

[22] Filed: Aug. 31, 1992

[51] Int. Cl.⁵ .................................. A01K 89/033
[52] U.S. Cl. ............................. 242/299; 242/317
[58] Field of Search ............ 242/282, 291, 294, 298, 242/299, 301, 302, 310, 317

[56] References Cited

U.S. PATENT DOCUMENTS

| | | | |
|---|---|---|---|
| 2,439,298 | 4/1948 | Horan | 242/282 X |
| 3,478,976 | 11/1969 | Sarah | 242/301 X |
| 3,591,107 | 7/1971 | Ferguson | 242/299 |
| 3,765,618 | 10/1973 | Johnson et al. | 242/317 |
| 4,733,830 | 3/1988 | Hollander | 242/301 X |
| 4,966,336 | 10/1990 | Humble et al. | 242/282 X |
| 5,092,075 | 3/1992 | Campos | 242/224 X |
| 5,120,003 | 6/1992 | Sacconi | 242/317 |

*Primary Examiner*—Daniel P. Stodola
*Assistant Examiner*—Michael R. Mansen

[57] ABSTRACT

Fishing reel for use on a rod which accepts a notched spool of fishing line of the kind commonly sold as replacement line spools. The reel provides for locking or rotation of the inserted replacement line spool by means of spring biased plungers which engage notches provided in the flanges of the line spool. The device includes a foam insert for stabilizing the rotation of the spool and for providing positive buoyancy to the assembled reel, line spool and insert.

2 Claims, 3 Drawing Sheets

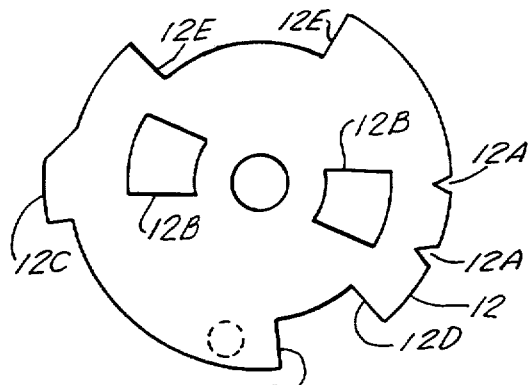
FIG. 5A
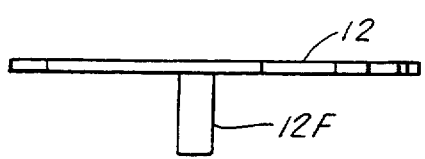
FIG. 5B
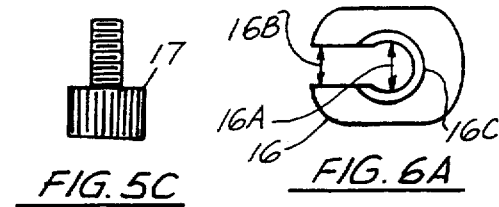
FIG. 5C  FIG. 6A
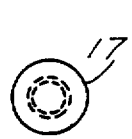
FIG. 5D
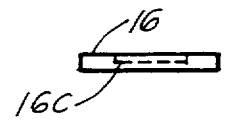
FIG. 6B
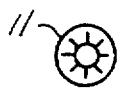
FIG. 7A
FIG. 7B
FIG. 7C
FIG. 7D
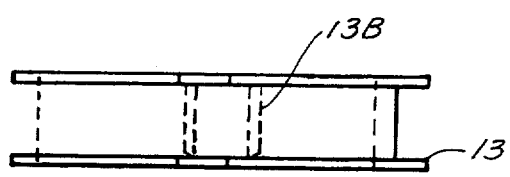
FIG. 8A
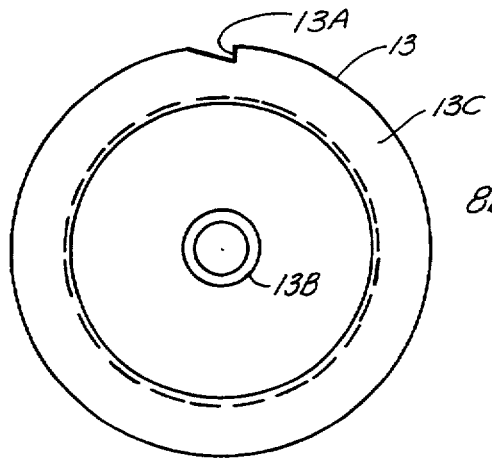
FIG. 8B
FIG. 7E
FIG. 7F

HAND POLE FISHING REELS

BACKGROUND OF THE INVENTION

This invention pertains to reel holders and line take up devices for mounting on fishing poles for reeling in and controlling a length of fishing line in the fishing process.

SUMMARY OF THE INVENTION

The invention is a fishing reel compatible with purchased wound spools of line available at sporting goods stores and bait shops. Popular types of wound spools and line are available in all sizes and various colors. The inventive reel can be used by a fisherman to adapt the line spool to the reel by modifications with a pocket knife to the line spool without removing the line from the spool. The resulting inventive fishing reel is simple in design, economical to manufacture and inexpensive to purchase and will provide the fisherman trouble-free, tangle-free performance. The combined line, fishing reel and wound spool of line will not sink if dropped into water. The fishing reel is tangle free due to the recessed construction of the drive cover, covering the flanges of the wound spool of line, and an adaptor reel base that extends over the flanges of the line spool, preventing the fishing line from running off of the line spool flanges to become tangled.

The fishing reel can be used on any type of hand pole and allow the fishing line to be changed in seconds by the fisherman without tools. The fishing line reel can be changed from a left hand to a right hand operation or right to left hand operation by the fisherman without tools. The fishing reel also includes a line removal feature that allows the fisherman to cut the line which is to be discarded into short harmless pieces.

It is an object of the invention to disclose a fishing reel that is simple in design, economical to manufacture, and inexpensive to purchase.

It is a further object of the invention to disclose a fishing reel that is compatible with purchased wound spools of line.

It is a further object of the invention to disclose a fishing reel which floats.

It is a further object of the invention to disclose a fishing reel which is free from tangling.

It is a further object of the invention to disclose a fishing reel in which the entire fishing line can be changed in seconds without using external tools.

It is a further object of the invention to disclose a fishing reel which can be changed from left hand to right hand or right to left hand operation without tools.

These or other objects of the invention will be more readily seen from the detailed description of the preferred embodiment.

BRIEF DESCRIPTION OF THE FIGURES

FIG. 5A is a top view of the shifting plate of the invention.

FIG. 5B is a side view of the shifting plate of the invention.

FIG. 5C is a side view of the drag screw.

FIG. 5D is a top view of the drag screw.

FIG. 6A is a top view of a keeping mechanism which holds the invention together.

FIG. 6B is a side view of a keeping mechanism which holds the invention together.

FIG. 7A is a top view of a push nut for maintaining the spring in position.

FIG. 7B is a side view of a push nut for maintaining the spring in position.

FIG. 7C is a side view of the spring which supports the locking and positioning plungers.

FIG. 7D is a top view of the spring which supports the looking and positioning plungers.

FIG. 7E is an exploded side view of the locking and positioning plungers.

FIG. 7F is an exploded top view of the locking and positioning plungers.

FIG. 8A is a side view of a fishing line spool as used with the invention.

FIG. 8B is a top view of a fishing line spool as used with the invention.

DETAILED DESCRIPTION OF THE INVENTION

Figure 1:
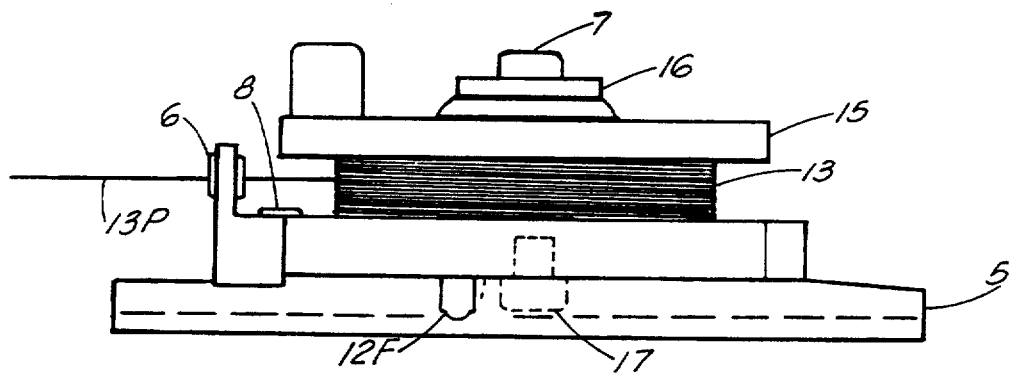
FIG. 1 shows a side view of the invention.
Figure 2:
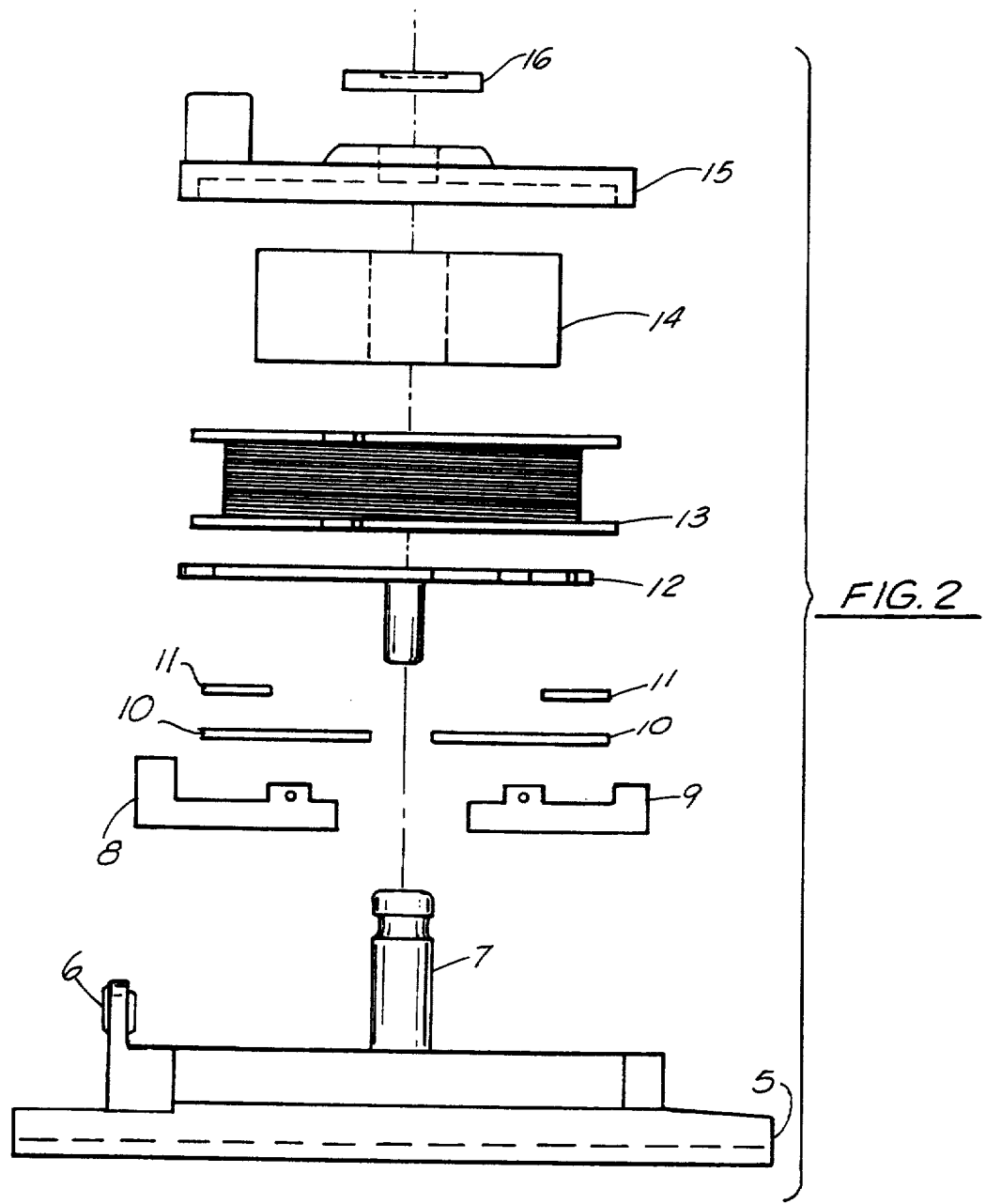
FIG. 2 is an exploded side view of the invention showing each component part.
Figure 3A:
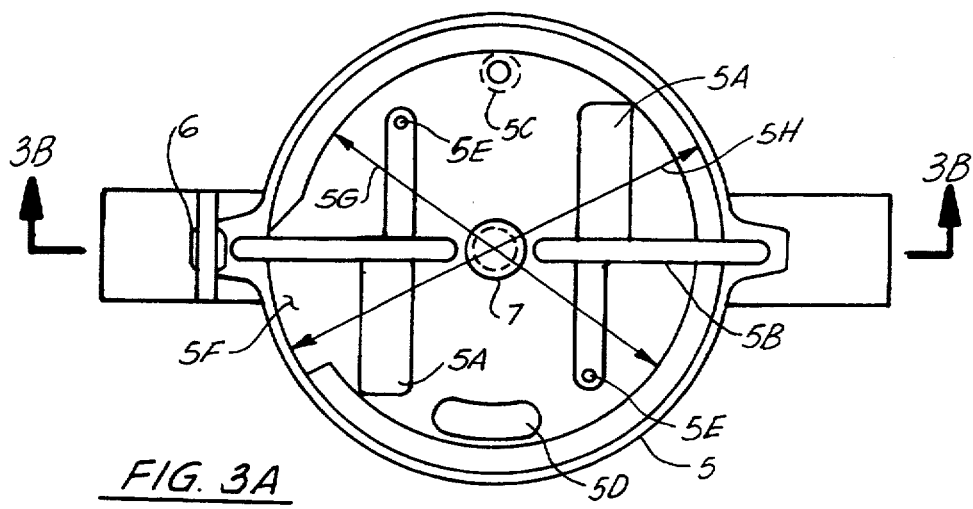
FIG. 3A is a top view of the invention base unit showing its internal recesses, cavities and features.
Figure 3B:
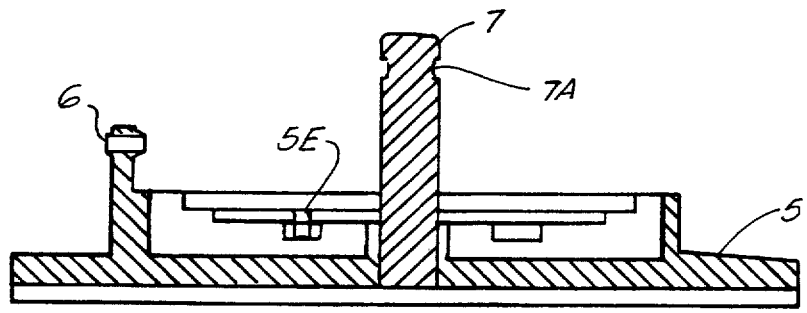
FIG. 3B is a section through the invention base unit showing its internal recesses, cavities and features.
Figure 4A:
FIG. 4A is a side section view of the drive cover of the invention.
Figure 9A:
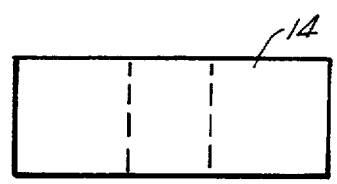
FIG. 9A is a side view of a floatation mechanism providing floatation for the device.
Figure 4B:
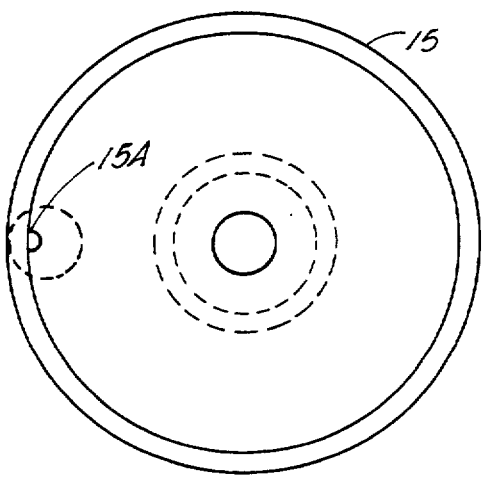
FIG. 4B is a top side section view of the drive cover of the invention.
Figure 9B:
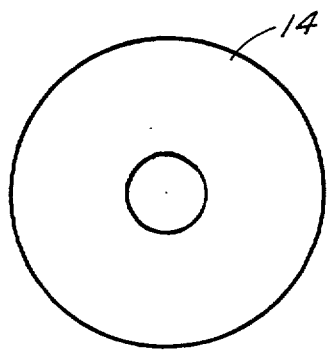
FIG. 9B is a top view of a floatation mechanism providing floatation for the device.

Referring to FIGS. 2, 5A–5D, 6A–6B, 7A–7F, 8A–8B, and 9A–9B, we show a side section exploded view of an assembly of the fishing reel of the invention. This comprises a reel base 5 having two internal cavities 5A which house two plunger springs 10. The wider end of each cavity 5A provides for the movement of the longer leg of each plunger spring 10 which in turn exerts pressure on plungers 8, 9 as they maintain pressure contact on the edges of a shifting plate 12.

Each cavity 5A is formed to a depth slightly deeper than the heighth of spring 10 when spring 10 is assembled inside the cavity. Two identical cavities 5B within Base 5 house a locking plunger 8 and a positioning plunger 9.

Within reel base 5 is a threaded through hole 5C to accommodate a drag screw 17. Also within base plate 5 is provided a radiused through slot 5D which accommodates an actuator 12F for shifting plate 12.

Two identical pins 5E are located in the narrow ends of the plunger spring cavities 5A for locating and securing plunger springs 10. A relief pocket 5F is formed along minor diameter 5G of the base plate 5. It allows a cam portion 12C of shifting plate 12 to shift backwards and forwards as a shifting plate is actuated, thus controlling the action of a locking plunger 8.

The minor diameter 5G of the reel base 5 houses the shifting plate 12. A major diameter 5H of the reel base 5 is formed to a depth twice the thickness of a flange 13C on the line spool 13. This prevents the fishing line 13P from passing over the edge of the spool 13 and becoming entangled.

A metal eyelet 6 is provided in a protrusion facing the side of the line spool 13. The line 13A passes through the metal eyelet 6 which provides for easy passage of line 13A from the spool 13 to the fishing pole.

A center post 7 is permanently assembled to the base 5.

A locking plunger 8 is controlled by the shifting plate 12. Locking plunger 8 lets a higher portion 8-B to fall into the notch 13-A of the line spool for the purpose of preventing fishing line 13P from being pulled from the reel when the shifting plate actuator is in the locked position. Each plunger 8 and 9 has a through hole 8A and 9A to accommodate the plunger springs. Raised portions 8C and 9C are for the purpose of strengthening the plungers and serve no other purpose. A positioning plunger 9 serves the reel to maintain the shifting plate 12 in the position selected by the fisherman. It is equal in height to the upper surface of the shifting plate 12.

Two identical plunger springs 10 maintain pressure on each plunger, keeping it in contact with the shifting plate 12 at all times.

Two identical push nuts 11 maintain the springs 10 in position on the pins 5E.

Shifting plate 12 controls the functions of the line spool 13 by means of the actuator, which extends through the opening 5D in the reel base 5 and is used by the fisherman to select the desired control of the line spool 13 in either a locked or a release position. Shifting plate 12 has an extended cam portion 12C that forces the locking plunger 8 away from the line spool 13 so that the plunger cannot enter notch 13A of the line spool 13 while the shifting plate actuator is in the release position, thus the fisherman can remove line from the spool.

Two -V- grooves 12A maintain the shifting plate 12 in the position selected by the fisherman by means of the spring loaded positioning plunger 9. A relief 12D in the shifting plate is for clearance for the push nut only.

A relief 12E in the shifting plate is for clearance to let the adjustable drag screw 17 contact the flange 13C of the line spool 13 so that the fisherman can adjust the amount of tension on the fishing line 13P.

Two openings 12B are for clearance for the upper portions 8C and 9C of plungers 8 and 9 in either position of the shifting plate 12.

Line spool 13 is constructed with two flanges 13A for keeping the line 13P from tangling. There are two identical notches 13A formed in the flanges 13C to accommodate the drive pin 15A of a drive cover 15 which rotates the spool 13. The notch in the lower flange engages the locking plunger 8 when the shifting plate 12 is actuated into locked position by the fisherman.

Line spool 13 can be used to control the direction of rotation chosen by the fisherman depending on whether he prefers right hand or left hand operation, simply by turning the line spool 13 over. NOTE— the line 13P is always wound onto the spool 13 so that the line 13P being withdrawn from the spool 13 will cause the locking plunger 8 to engage the perpendicular side of the notch 13A.

The notch 13A is also for the purpose of allowing the fisherman to remove worn or undesirable line from the reel by cutting through the line while it is still on the spool 13, by using a simple knife and cutting through the line which will cut the line in short pieces not dangerous to the environment, as would be the case if the line were pulled from the reel as is now necessary when removing undesirable fishing line. This is presently a major problem in our environment, and this spool design is a simple answer to this very dangerous problem.

An internal float 14 is fabricated from closed cell foam plastic and will not absorb water. The feature will float the reel in case it is lost overboard or dropped into the water. The float 14 is assembled within the hollow recess of the line spool 13 and around the center hub 13A. The internal float 14 is slightly longer in length than the depth of the recess of the line spool 13; thus, when the reel is assembled the float, 14 acts to reduce noise when the line spool 13 is being turned rapidly.

The drive cover 15 is recessed to a depth approximately twice the thickness of the line spool flange 13C to prevent the fishing line 13P from passing over the flange 13C of the line spool 13 and becoming tangled. The recessed cavity of the drive cover 15 is slightly larger in diameter than the diameter of the line spool 13 and has a drive pin 15A to engage the notch 13A of the line spool 13 thus rotating the line spool 13 when the fisherman turns the rotating handle 15B of the drive cover to the retrieve line. The drive cover 15 has a raised center portion 15C which adds strength to the drive cover and aids in the assembly of the reel especially when keeper 16 is being installed or removed.

Keeper 16 maintains the reel components in their proper working relationship to each other. The C-shaped design with the center diameter 16A being the exact size as the diameter 7A Of the center post 7 and larger than the dimension 16B of the keeper 16 gives the keeper 16 a spring action, maintaining the keeper 16 in position around the diameter —7A of the center post 7. The keeper 16 has a recessed diameter slightly larger than the major diameter of the center post 7 and is formed to a depth slightly less than the thickness of the keeper so that the keeper 16 can be reversed to adjust the pressure on the assembled components of the reel.

The drag adjustment screw 17 is assembled into a threaded hole 5C of the reel base 5 and contacts the flange 13C of the line spool 13. Thus by adjusting the pressure of the drag screw 17 upon the line spool flange 13C, a fisherman can regulate the tension on the fishing line 13P and the amount of pressure required to rotate the line spool 13. Using this feature, the fisherman can use the reel with the actuator 12F of the shifting plate 12 in the release position allowing a hooked fish to take the line from the reel without the danger of breaking the line.

I claim:

1. A fishing reel for replaceable line spools comprising:
   a base having a control post attached thereto;
   a shifting plate assembled over said control post;
   means for shifting said shifting plate from a locked to a released position;
   a replaceable spool of fishing line having a hub and annular flanges;
   each said flange having a notch extending radially toward said hub;
   Said spool assembled over a control post in juxtaposition to said shifting plate;
   a drive cover assembled over said line spool in juxtaposition thereof;
   means on said drive cover for engaging and turning said spool about said control post;
   means, controlled by said shifting plate, for locking said line spool from turning in said locked position of said shifting plate and for releasing said line spool for turning in said released position of said shifting plate;

means, connected to said control post for holding said base, said shifting plates, said line spool, and said drive plate, an operable engagement; and an annular foam insert operably engaged within said line spool around said control post, said foam insert providing positive buoyancy to said fishing reel;

said foam insert supporting said line spool against chatter.

2. A fishing reel for replaceable line spools comprising:

a base having a control post attached thereto;

a shifting plate assembled over said control post;

means for shifting said shifting plate from a locked to a released position;

a replaceable spool of fishing line having a hub and annular flanges;

each said flange having a notch extending radially toward said hub;

said spool assembled over a control post in juxtaposition to said shifting plate;

a drive cover assembled over said line spool in juxtaposition thereof;

means on said drive cover for engaging and turning said spool about said control post;

means, controlled by said shifting plate, for locking said line spool from turning in said locked position of said shifting plate and for releasing said line spool for turning in said released position of said shifting plate;

means, connected to said control post for holding said base, said shifting plates, said line spool, and said drive plate, an operable engagement; and said means for locking further comprising:

said notch in the flange of said line spool having one substantially straight side and one angled side;

a spring-loaded plunger recessed within said base being biased to engage said line spool flange notch against said straight edge, being displaceable by said line spool flange notch angled edge; and means on said shifting plate for displacing said plunger from a position of engagement with said notch to a position free of said notch.

* * * * *